(12) United States Patent
Badger (10) Patent No.: US 6,925,559 B2
(45) Date of Patent: Aug. 2, 2005

(54) REDUCING EFFECTS OF TRANSMISSION LINE REFLECTIONS BY CHANGING TRANSMISSION LINE PEDESTAL VOLTAGE OR RECEVER THRESHOLD VOLTAGE WHILE MONITORING FOR IRREGULAR SYNCHRONIZATION

(75) Inventor: Michael H. Badger, Freeport, TX (US)

(73) Assignee: Dell Products L.P., Round Rock, TX (US)

( * ) Notice: Subject to any disclaimer, the term of this patent is extended or adjusted under 35 U.S.C. 154(b) by 759 days.

(21) Appl. No.: 09/916,764

(22) Filed: Jul. 27, 2001

(65) Prior Publication Data

US 2003/0023886 A1 Jan. 30, 2003

(51) Int. Cl.$^7$ ................................................ G06F 1/24
(52) U.S. Cl. .................... 713/100; 326/22; 326/30; 333/17.3; 348/533
(58) Field of Search .................. 713/100; 348/533; 326/22, 30; 333/17.3

(56) References Cited

U.S. PATENT DOCUMENTS 5,307,379 A * 4/1994 Bergstrom et al. .......... 375/317
5,995,152 A    11/1999 Labuda ....................... 348/428
6,804,724 B2 * 10/2004 Shin ............................ 710/2

OTHER PUBLICATIONS

National Semiconductor, "An Overview of LVDS Technology", Application Note 971, Jul. 1998.*

Asian Technology Information Program (ATIP), "Digital Interface Standards for Computer Monitors", Dec. 2, 1998.*

* cited by examiner

Primary Examiner—Thomas Lee
Assistant Examiner—Albert Wang
(74) Attorney, Agent, or Firm—Haynes and Boone, LLP (57) ABSTRACT

A system and method of reducing an effect of signal distortion from reflection on a transmission line include changing at least one of a pedestal voltage level on the transmission line and a signal threshold voltage level in a processor coupled to the transmission line, such that the pedestal voltage level and the signal threshold voltage level are not substantially equal after the changing, and such that the effect of signal distortion from reflection on the transmission line is reduced.

30 Claims, 6 Drawing Sheets

REDUCING EFFECTS OF TRANSMISSION LINE REFLECTIONS BY CHANGING TRANSMISSION LINE PEDESTAL VOLTAGE OR RECEIVER THRESHOLD VOLTAGE WHILE MONITORING FOR IRREGULAR SYNCHRONIZATION

BACKGROUND

The present disclosure relates to the field of computer system manufacturing and computer system operations. More specifically, this disclosure relates to reducing an effect of signal distortion from reflection on transmission lines.

Computer systems have attained widespread use for providing computing power to many segments of today's modem society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to connect these components together electrically. These personal computer systems are information handling systems which are designed primarily to give independent computing power to a single user (or a group of users in the case of personal computers which serve as computer server systems) and are inexpensively priced for purchase by individuals or small businesses.

A personal computer system may also include one or more of a plurality of input/output ("I/O") devices that are coupled to the system processor and that perform specialized functions. Examples of I/O peripheral devices include modems, sound and video devices, or specialized communication devices. Mass storage devices such as hard disks, compact disk ("CD") drives of many varieties, magneto-optical drives, and other data storage devices are also considered to be peripheral devices.

In particular, many personal computer systems have monitors that provide the user of the system with a visual display. This visual display can provide, e.g., visual output or a visual interface for the operation of computer software.

Most personal computer systems based on the INTERNATIONAL BUSINESS MACHINES ("IBM®") architecture use an interface cable to connect the monitor to the remainder of the personal computer system. This cable generally has a characteristic impedance of approximately 30 to 120 $\Omega$ and is terminated with an impedance of value $Z_t$ that can range from approximately 2.2 k$\Omega$ to 4.7 k$\Omega$ or more. This termination impedance is so far removed from the characteristic impedance of the cable that the cable is effectively unterminated. This condition gives rise to reflections of fast signals on the line, which in turn give rise to distortions of those signals. In particular, horizontal synchronization ("h-sync") are sometimes distorted in this way.

In some computer systems involving specific items of equipment, these signal distortions on the h-sync line in the interface cable erratically trigger the h-sync processor. This condition manifests as "jitter," wherein the visual display on the monitor screen is unstable in the horizontal axis. This jitter can be very distracting for a user, and in extreme cases the jitter makes it difficult or impossible for a user to read the image on the monitor screen.

One of the few practical methods of reducing this problem has been to provide an adapter plug for a particular computer system in which this problem has occurred, since the problem occurs in a relatively small number of computer system equipment combinations. The adapter plug contains a resistor in series with the h-sync signal to move the distorted signal to another voltage to separate it from the signal threshold voltage level of the h-sync signal receiver. However, manufacture of the adapter, shipping to customers when the problem occurs, and installation of the adapter are relatively expensive solutions. Because the problem occurs only rarely, this solution, to remain cost-effective, often requires allowing the problem to occur in the field (e.g., after sale to and installation for a customer) when particular monitors are used in particular computer system configurations, and only then applying the adapter. If the adapter is installed in every computer system shipped, the problem will simply occur in set of computer system configurations other than the set in which it would have occurred absent the adapters.

Another method of reducing this problem involves adding a filter circuit to such an adapter plug to lengthen the rise time of the h-sync signal sufficiently to eliminate the reflections. This solution, however, induces a new form of undesirable jitter, in addition to the drawbacks already mentioned.

What is needed is a system and method that reduces reducing effects of transmission line reflections, such as jitter in a computer system monitor display caused by reflections on the h-sync line to the monitor, that does not involve the expensive manufacture, shipping, and installation of adapters and that does not cause another type of undesirable jitter while reducing the original problem.

SUMMARY

A system and method are presented for reducing effects of transmission line reflections, such as jitter in monitor display resulting from the effects of reflections on the horizontal synchronization ("h-sync") line to the monitor in a computer system, that provides a cost-effective solution that is easy to implement when the effects manifest in a computer system in the field, and that does not induce any other undesirable problems when implemented.

A computer system is presented comprising a processor, an interface cable coupled to the first processor, a monitor including a receiver input gate coupled to the interface cable, and changing circuitry coupled to the interface cable and to a receiver input gate and capable of changing at least one of a pedestal voltage level on the interface cable and a signal threshold voltage level in the receiver input gate, such that the pedestal voltage level and the signal threshold voltage level are not substantially equal after the change is made.

A method of reducing an effect of signal distortion from reflection on a transmission line is presented, comprising changing at least one of a pedestal voltage level on the transmission line and a signal threshold voltage level of a receiver input gate coupled to the transmission line, such that the pedestal voltage level and the signal threshold voltage level are not substantially equal after the changing, and such that the effect of signal distortion from reflection on the transmission line is reduced.

An apparatus for reducing an effect of signal distortion from reflection on a transmission line is presented, comprising means for changing at least one of a pedestal voltage level on the transmission line and a signal threshold voltage level of a receiver input gate coupled to the transmission line, such that the pedestal voltage level and the signal threshold voltage level are not substantially equal after the changing, and such that the effect of signal distortion from reflection on the transmission line is reduced.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

The following sets forth a detailed description of a mode for carrying out the several embodiments. The description is intended to be illustrative of the embodiments and should not be taken to be limiting.

Figure 1:
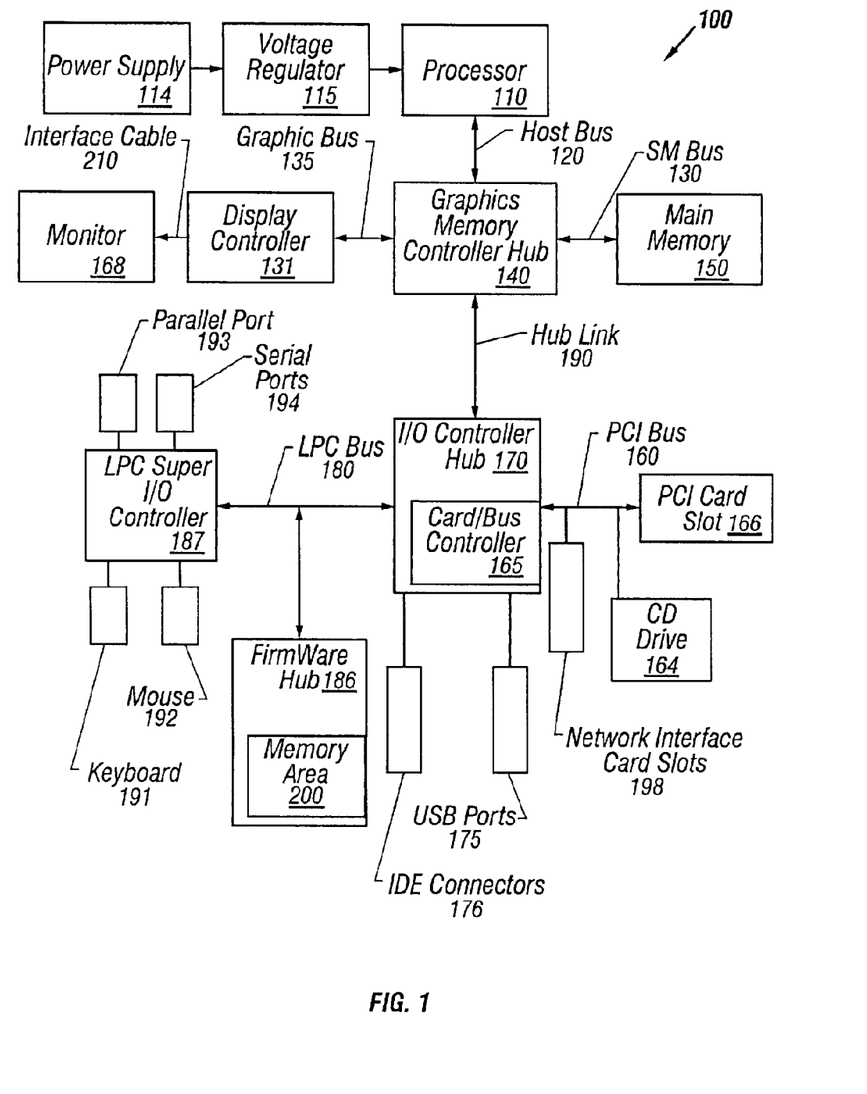
FIG. 1 is a block diagram showing features of a computer system.

FIG. 1 is a block diagram of example computer system 100 that may be found in many forms, including, e.g., mainframes, minicomputers, workstations, servers, personal computers, internet terminals, notebooks, and embedded systems. Personal computer ("PC") systems, such as those compatible with the ×86 configuration, include desktop, floor standing, or portable versions. Example computer system 100 includes a computer system hardware unit that further includes a microprocessor (or simply "processor") 110, associated main memory 150, a number of peripheral devices that provide I/O for computer system 100, and computer system software that runs on the hardware unit. Example computer system 100 is powered by power supply 114 with voltage regulator 115. The peripheral devices often include keyboard 191, mouse-type input device 192, CD drive 164, and others not shown, including floppy and hard disk drives, modems, printers, terminal devices, televisions, sound devices, voice recognition devices, electronic pen devices, and mass storage devices such as tape drives or digital video disks ("DVDs").

The peripheral devices usually communicate with the processor over one or more peripheral component interconnect ("PCI") slot 166, universal serial bus ("USB") ports 175, or integrated device electronics ("IDE") connectors 176. PCI card slots 166 may use card/bus controller 165 to connect to one or more buses such as host bus 120, PCI bus 160, and low pin count ("LPC") bus 180, with the buses communicating with each other through the use of one or more hubs such as graphics controller memory hub 140 and I/O controller hub 170. Typical systems such as example computer system 100 often include network interface card slots 198 to accommodate network cards that mediate between the computer and the physical media over which transmissions to and from computer system 100 travel. USB ports 175 and IDE connectors 176 may connect to one or more of hubs 140, 170. The hubs may communicate with each other through the use of one or more links such as hub link 190. Generally, I/O devices can also be accommodated by parallel port 193 and serial ports 194 that are coupled to I/O controller 187 that is in turn coupled to LPC bus 180. Typical computer systems often include monitor 168 coupled to a display controller 131 coupled to graphics memory controller hub 140 by a graphics bus 135 and main memory 150 coupled to graphics memory controller hub 140 by a system management ("SM") bus 130. Finally, a typical computer system also includes software modules known as the basic input/output system (BIOS) (not shown). The BIOS code is either copied from an external medium such as a CD to, or stored on, memory area 200 in firmware hub 186.

In particular, FIG. 1 shows display controller 131 coupled to monitor 168 by interface cable 210, an area of example computer system 100 in which effects of transmission line reflections such as those discussed above have been found to occur.

It will be appreciated that a person skilled in the art will recognize that a computer system may be implemented in a variety of ways of which computer system 100 of FIG. 100 is merely an example and is not intended to be limiting.

Figure 2:
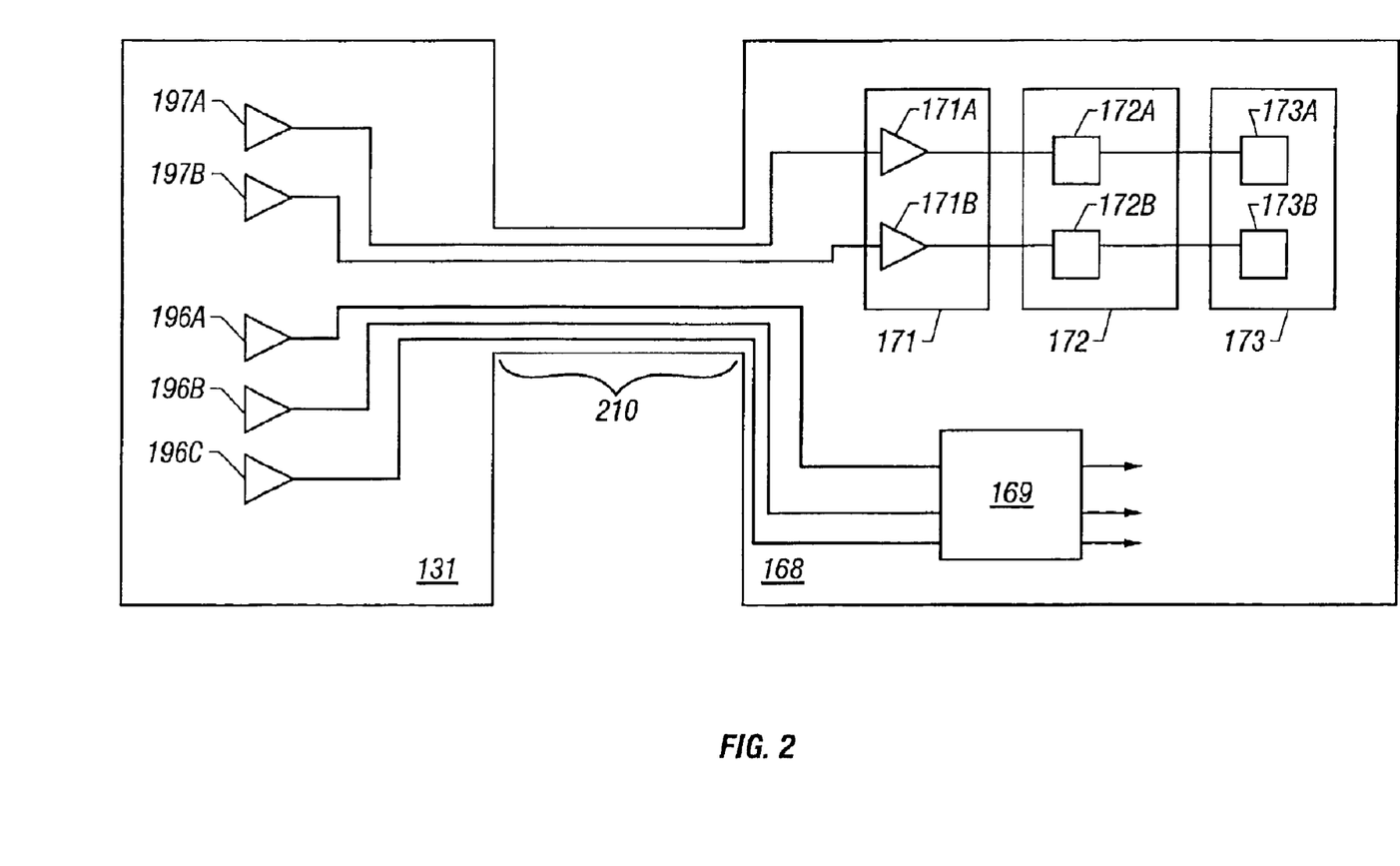
FIG. 2 is a block diagram showing details of a typical arrangement of a display controller interfaced with a monitor.

FIG. 2 is a block diagram of a relevant part of display controller 131 in combination with monitor 168, showing more detail than is shown in FIG. 1. Display controller 131 is shown containing, among other components not shown, output gates 196A, 196B, and 196C for the red, green, and blue color components, respectively, of the video image to be sent to monitor 168. Display controller 131 is also shown containing output gates for horizontal and vertical synchronization signals 197A and 197B, respectively, of the video image to be sent to monitor 168. Each of the output gates 196A, 196B, 196C, 197A, and 197B feed into interface cable 210 connecting display controller 131 to monitor 168. It will be appreciated that interface cable 210 may comprise separate cables or one multi-conductor cable.

As used herein, the term "display controller" includes the "graphics circuit" and/or the "video circuit" known to those skilled in the art and found in computer systems 100. Although shown as one unit in FIG. 1, it will be appreciated that a person skilled in the art will recognize that display controller 131 is not limited to implementation as one circuit card or as any other particular hardware configuration; the functions of display controller 131 may be partitioned at the discretion of the designer. Display controller 131 as depicted is merely an example and is not intended to be limiting.

From interface cable 210, the signals from the red, green, and blue output gates, 196A, 196B, and 196C, respectively, travel to video amplifiers 169, and control the illumination of red, green, and blue phosphor dots on the screen of monitor 168. The signals for the horizontal and vertical synchronization output gates 197A and 197B travel from interface cable 210 to horizontal and vertical synchronization receiver input gates 171A and 171B, respectively, (together, receiver input gates 171) in monitor 168, from receiver input gates 171 to horizontal and vertical synchronization processors 172A and 172B, respectively, (together, synchronization or sync processor 172), and from sync processor 172 to horizontal and vertical deflectors 173A and 173B, respectively, which control the deflection of the electron beam used to illuminate the screen of monitor 168.

Figure 3:
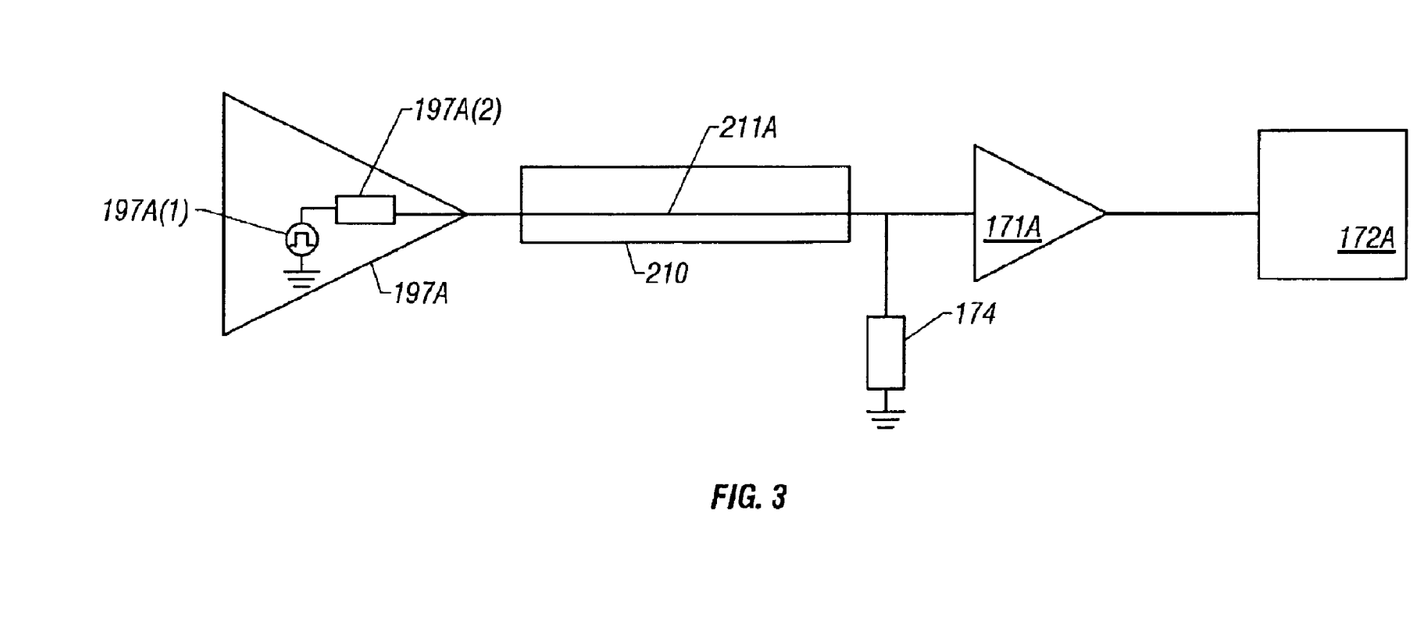
FIG. 3 is a block diagram showing details of an arrangement of an h-sync output gate interfaced with a monitor h-sync processor.

FIG. 3 is a block diagram of h-sync output gate 197A, interface cable 210, h-sync receiver input gate 171A, and h-sync processor 172A, showing more detail than is shown in FIG. 2. H-sync output gate 197A is represented as an ideal voltage source 197A(1) with internal impedance 197A(2) of value $R_s$. H-sync output gate 197A drives the h-sync line 211A inside interface cable 210. The wire/shielding combination of line 211A has a characteristic impedance of $Z_c$. H-sync line 211A is terminated at the monitor end with terminal impedance 174 of value $R_t$.

Vertical synchronization output gate 197B drives the vertical synchronization line 211B (not shown) inside interface cable 210. Similarly, color component output gates 196A, 196B, 196C drive color component lines 212A, 212B, and 212C inside interface cable 210 (not shown).

The monitor end of h-sync line 210A is coupled to h-sync receiver input gate 171A. When the h-sync pulse arrives over h-sync line 211A at h-sync receiver input gate 171A, h-sync receiver input gate 171A produces a buffered pulse similar in width to that of the incoming pulse when the rising edge of the incoming pulse reaches the signal threshold voltage level of h-sync receiver input gate 171A. In one embodiment, h-sync receiver input gate 171A performs similarly to a comparator, comparing the voltage of the h-sync pulse to a reference voltage. This buffered pulse is sent from h-sync receiver input gate 171A to h-sync processor 172A. Synchronization signals from sync processor 172 control the timing of the horizontal and vertical scans of the electron beam that is used to strike the phosphor dots on the screen of monitor 168.

Video circuit synchronization output gates such as h-sync output gate 197A generally have insufficient drive capability to drive low impedance. For this reason, industry standards define the minimum h-sync line termination resistance $R_t$ on the monitor end of the line to be equal to or greater than 2.2 k$\Omega$. Because the characteristic impedance of coaxial cables generally ranges from 30–120$\Omega$, h-sync output gate "sees" interface line 210A as an effectively unterminated transmission line.

It will be appreciated that a person skilled in the art will recognize that an h-sync circuit may be implemented in a variety of ways of which the elements depicted in FIG. 3 of Figure are merely an example and are not intended to be limiting.

Figure 4:
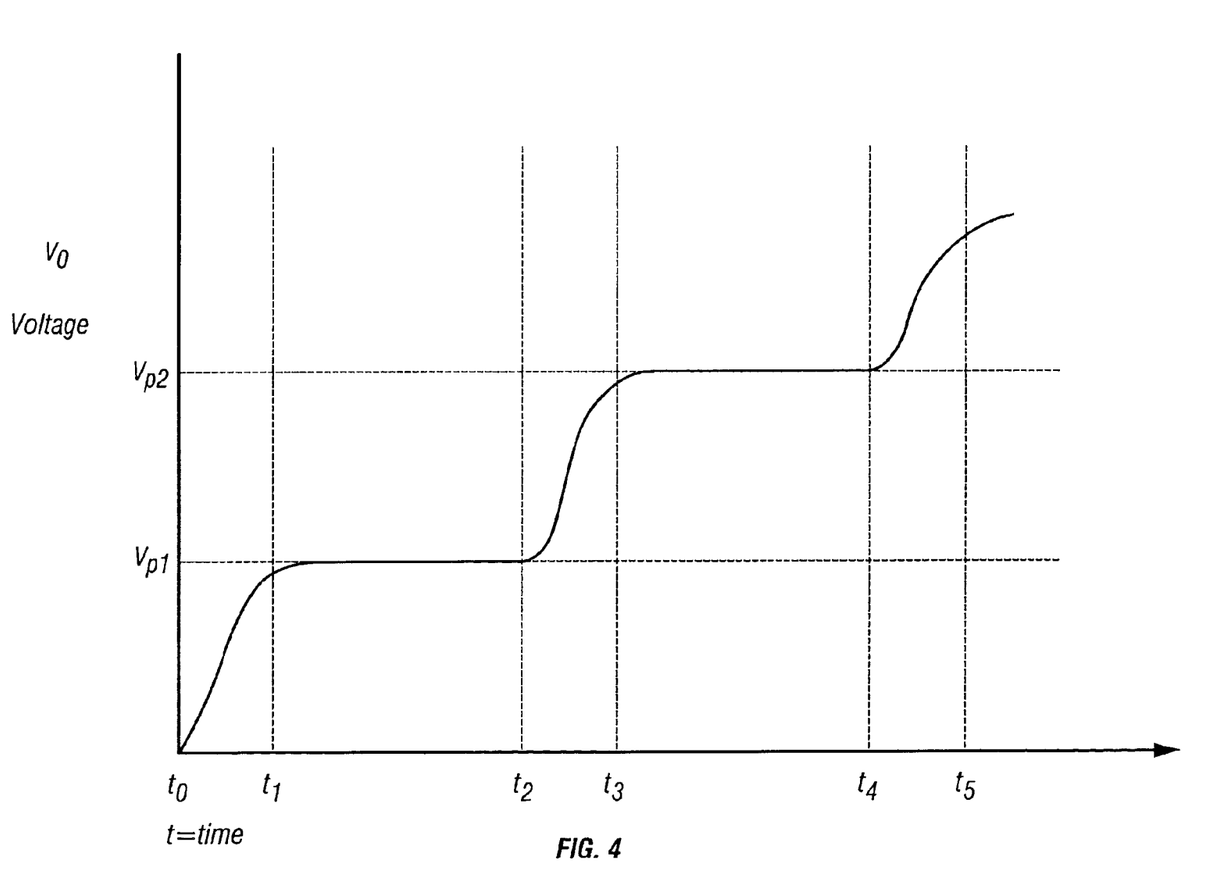
FIG. 4 is a graph showing the effect of transmission line reflections on a signal pulse.

FIG. 4 illustrates the h-sync signal distortions in a signal pulse being generated by h-sync output gate 197A that result from the reflections that themselves result from the effectively unterminated interface line, as measured as the h-sync driver end of h-sync line 211A. The extent of h-sync signal distortions due to these reflections depends on the internal impedance of h-sync output gate 197A together with the cable impedance of the h-sync line, together generally about $Z_C$=39 $\Omega$.

During the period from time $t_o$ to time $t_1$, h-sync output gate 197A "sees" h-sync line 211A to be terminated with the effective impedance $Z_c$ of the interface line, output voltage $V_O$ of h-sync output gate 197A rises from $V_O$=0. During the period from time $t_1$ to time $t_2$ output voltage $V_O$ substantially levels off at the voltage level appropriate to drive a load of impedance $Z_C$. This substantial leveling-off is called a "pedestal" in the output signal of h-sync output gate 197A. In FIG. 4, this pedestal voltage level is designated as $V_{p1}$.

The period from time $t_o$ to time $t_2$ is approximately the propagation time for a signal to travel from h-sync output gate 197A to the other end of the h-sync line 211A plus the reflection of that signal to travel along h-sync line 211A back to h-sync output gate 197A.

During the period from time $t_2$ to time $t_3$, the output voltage $V_O$ of h-sync output gate 197A rises again because the signal generated by h-sync output gate 197A has been reflected from the very large terminal impedance 174 of value $Z_t$ at the monitor end of h-sync line 211A, and that reflection has reached h-sync output gate 197A. This reflection causes h-sync output gate 197A to "see" h-sync line 211A to be unterminated.

During the period from time $t_3$ to time $t_4$, the output voltage of h-sync output gate 197A substantially levels off again, forming another pedestal, because h-sync line 211A once again appears to h-sync output gate 197A to be terminated with the effective impedance $Z_C$ of the interface line. This pedestal has voltage $V_{p2}$.

The period from time $t_2$ to time $t_4$, like the period from time to $t_0$ time $t_2$, is approximately the propagation time for a signal to travel from h-sync output gate 197A to the other end of the h-sync line 211A plus the reflection of that signal to travel along h-sync line 211A back to h-sync output gate 197A.

During the period from time $t_4$ to time $t_5$, the output voltage of h-sync output gate 197A rises again because the signal reflection has reached h-sync output gate 197A, again causing h-sync output gate 197A to "see" h-sync line 211A to be unterminated.

This sequence of alternating voltage rises and pedestals continues until the h-sync driver's capability to raise voltage $V_O$ has been reached, at which point voltage $V_O$ levels off with no further rises. This capability may be reached at any point in time from time $t_o$ to time $t_5$ or later in the sequence described in connection with FIG. 4.

When such reflections cause an h-sync signal pedestal voltage level that is substantially equal to the signal threshold voltage level of h-sync receiver input gate 171A, noise that is invariably present in the signal causes h-sync receiver input gate 171A to trigger each time the signal rises above the signal threshold voltage. This noise is by nature erratic, resulting in screen "jitter" in the horizontal direction. This jitter can be very distracting for a user, and in extreme cases the jitter makes it difficult or impossible for a user to read the image on the monitor screen.

As used herein, the terms "substantially equal," "substantial equality," and like terms refer to a difference between different voltage levels small enough for the pedestal voltage level and the signal threshold voltage level of h-sync receiver input gate 171A to be close enough for effects of transmission line reflections to manifest. For the example configurations discussed herein, when "substantially equal" or a like term is used to compare the pedestal voltage level and the signal threshold voltage level of h-sync receiver input gate 171A, a difference between different voltage levels of less than approximately 100 mV means that the voltage levels are "substantially equal." It will be appreciated that one skilled in the art will recognize that in configurations other than the example configurations discussed herein, the effects of transmission line reflections will manifest when the difference between different voltage levels is of a value other than approximately 100 mV.

The system and method disclosed herein teaches changing either a pedestal voltage level on a transmission line or a signal threshold voltage level in a processor coupled to the transmission line when jitter occurs, in order to stop the jitter. Once this shift occurs, the signal pedestal is no longer substantially equal to the signal threshold voltage level and the jitter stops.

In one embodiment, a computer system user is enabled to use software running on a computer system to stop the jitter when the jitter occurs. For example, many computer systems 100 feature an "on-screen display" software program or software routine that enables a computer user to control functions such as, e.g., brightness and contrast, using a display on the screen of monitor 168. On-screen display software is generally installed and run on a processor in monitor 168, but one skilled in the art will appreciate that such software may be installed and may run in memory 150 or in other memory and on processor or processors 110 elsewhere in computer system 100. In an aspect of this embodiment, the on-screen display on monitor 168 features a software selection feature such that, when jitter occurs, a user can make a selection and a hardware circuit including h-sync output gate 197A, h-sync line 211A, h-sync receiver input gate 171A is modified to shift either the pedestal or the threshold voltage level of h-sync receiver input gate 171A to stop the jitter. The on-screen display feature itself is generally not affected by the jitter problem, because that feature is generally clocked internally with respect to monitor 168, and its image on the screen of monitor 168 is not subject to the effects of reflections on h-sync line 211A.

It will be appreciated that a person skilled in the art will recognize that use of software to stop the jitter may be implemented in a variety of ways of which on-screen display software is merely an example and is not intended to be limiting, and will recognize other such non-limiting examples including implementation through hardware controls on monitor 168, through the operating system of computer system 100, through any software application, or through any other means that can be coupled to circuitry that can effect a change of the pedestal voltage level and/or the signal threshold voltage level of h-sync receiver input gate 171A or the input level of a device or group of devices analogous to h-sync receiver input gate 171A.

In another embodiment, computer system 100 (including monitor 168) includes circuitry to monitor the output of synchronization processor 172A for irregularly timed output signals, to detect the condition in which the pedestal voltage level and the threshold voltage level of h-sync receiver input gate 171A are substantially equal. If such signals are detected, the pedestal voltage level and/or the signal threshold voltage level are changed. This change may be made either by circuitry designed to make the change automatically upon detection or by software designed to register the detection of irregularly timed signals and to command circuitry to make the change. In one aspect of this embodiment, the output of synchronization processor 172A is compared to a stable time reference in monitor 168 and the comparison permits detection of irregularly timed output signals. In another aspect of this embodiment, the phasing output of synchronization processor 172A is compared to the phasing of the output of video amplifier 169, and the comparison permits detection of irregularly timed output signals. It will be appreciated that a person skilled in the art will recognize that detection of the condition in which the pedestal voltage level and the threshold voltage level of h-sync receiver input gate 171A are substantially equal can be performed in other ways besides the detection of irregularly timed output signals from synchronization processor 172A, and that the detection of irregularly timed output signals by comparison to a stable time reference, and by comparison to the phasing of the output of video amplifier 169 are merely examples and is not intended to be limiting.

Figure 5:
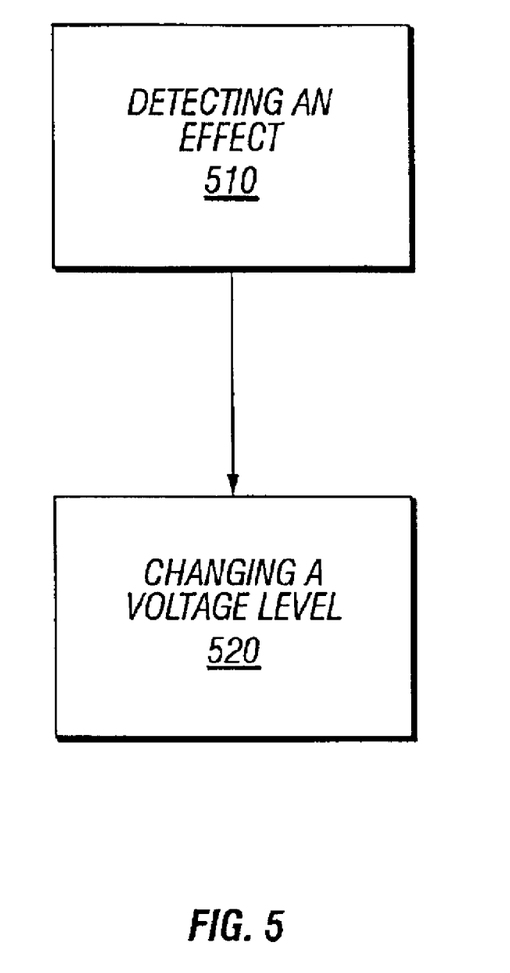
FIG. 5 is a flow chart showing steps in an embodiment of the present disclosure.

FIG. 5 shows the steps in one embodiment: detecting an effect of signal distortion from reflection on a transmission line caused by a substantial equality of a pedestal voltage level on the transmission line and a signal threshold voltage level in a processor coupled to the transmission line (step 510); and changing at least one of (1) the pedestal voltage level and (2) the signal threshold voltage level, such that the pedestal voltage level and the signal threshold voltage level are not substantially equal after the changing (step 520).

Figure 6:
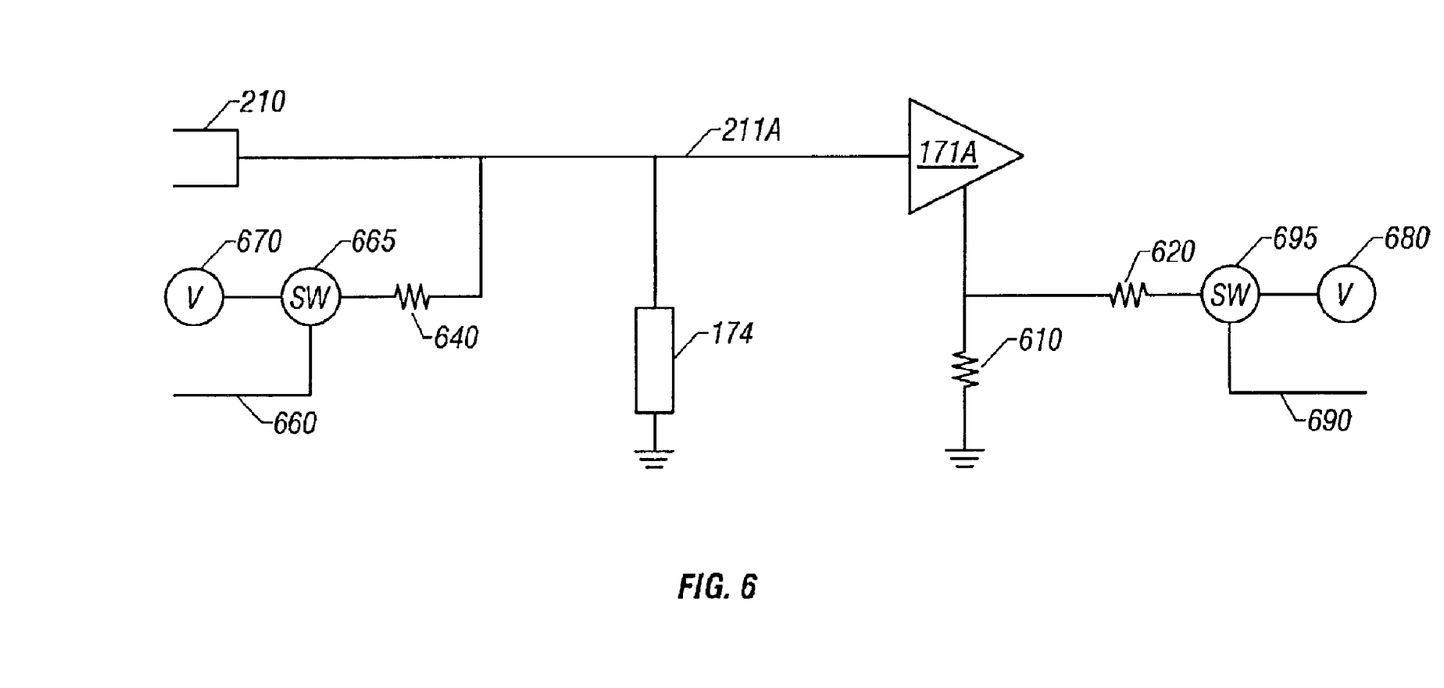
FIG. 6 is a circuit diagram showing an embodiment of the system presented.

FIG. 6 shows circuitry in one embodiment. The signal threshold voltage level in h-sync receiver input gate 171A is shifted by raising or lowering the signal threshold voltage level of h-sync input gate 171A, such that the pedestal voltage level is no longer substantially equal to the signal threshold voltage level. This change may be accomplished by sending a signal in response to input to software, e.g., the on-screen display software, to apply or remove current through resistors 620 and 610. FIG. 6 shows circuitry for making this shift comprising a control input line 690 carrying a signal to open or close switch 695 connecting voltage source 680 to impedance 620, but it will be appreciated that one skilled in the art will recognize that control of the signal threshold voltage level of h-sync input gate 171A can be implemented in other ways, such as with digital logic elements.

Continuing to refer to FIG. 6, the pedestal voltage level is shifted by raising or lowering the current into a point that is positioned between the monitor end of h-sync line 211A and h-sync receiver input gate 171A, by an amount sufficient to raise the voltage level of that point and of the pedestal voltage level, such that the pedestal voltage level is no longer substantially equal to the signal threshold voltage level of h-sync receiver input gate 171A. This change may be accomplished by sending a signal in response to input to software, e.g., the on-screen display software, to apply or remove current through line 650 and an impedance 640 which must be several times higher that impedance $Z_C$. Preferably, impedance 640 is twenty times or more the value of impedance $Z_C$. FIG. 6 shows circuitry for making this shift comprising control input line 660 carrying a signal to open or close switch 665 connecting voltage source 670 to impedance 640, but it will be appreciated that one skilled in the art will recognize that control of the current through line 650 to change the pedestal voltage level can be implemented in other ways, such as with digital logic elements.

In many applications, a raising or lowering of the pedestal voltage level by about 100 mV would be sufficient to stop the jitter.

In many applications, a raising or lowering of the processor input gate level by about 100 mV would be sufficient to stop the jitter.

It will be appreciated that a person skilled in the art will recognize that use of circuitry to stop the jitter may be implemented in a variety of ways of which the circuitry depicted in FIG. 6 is merely an example and is not intended to be limiting. Further, it will be appreciated that a person skilled in the art will recognize that changing the pedestal voltage level and/or the signal threshold voltage level of h-sync receiver input gate 171A or the input level of a device or group of devices analogous to h-sync receiver input gate 171A by a value of 100 mV will be recognized by a person skilled in the art as an example of an efficacious value and is not intended to be limiting.

Other Embodiments

One skilled in the art will recognize that the foregoing components (e.g., steps), devices, and objects in FIGS. 1, 2, 3, 4, 5, and 6 the discussion accompanying them are used as examples for the sake of conceptual clarity and that various configuration modifications are common. Consequently, as used herein the specific examples set forth in FIGS. 1, 2, 3, 4, 5, and 6 and the accompanying discussion are intended to be representative of their more general classes. In general, use of any specific example herein is also intended to be representative of its class, and the non-inclusion of such specific components (e.g., steps), devices, and objects herein should not be taken as indicating that limitation is desired.

While particular embodiments of the present disclosure have been shown and described, it will be obvious to those skilled in the art that, based upon the teaching herein, changes and modifications may be made without departing from this disclosure and its broader aspects and, therefore, the appended claims are to encompass within their scope all such changes and modifications as are within the true spirit and scope of this disclosure. Furthermore, it is to be understood that the disclosure is solely defined by the appended claims.

Other embodiments are within the following claims.

What is claimed is:

1. A computer system comprising:
    a first processor;
    a transmission line coupled to the first processor;
    a monitor including a receiver input gate coupled to the transmission line;
    changing circuitry coupled to the transmission line and to the receiver input gate and capable of changing at least one of a pedestal voltage level on the transmission line and a signal threshold voltage level of the receiver input gate, such that the pedestal voltage level and the signal threshold voltage level are not substantially equal after the change is made;
    a synchronization processor coupled to the receiver input gate;
    monitoring circuitry coupled to the synchronization processor and capable of monitoring an output of the synchronization processor and detecting irregularly timed synchronization processor output signals; and
    wherein the changing circuitry is further capable of changing at least one of the pedestal voltage level and the signal threshold voltage level when the monitoring circuitry detects irregularly timed output signals.

2. The computer system of claim 1, wherein:
    a software program coupled to a second processor enables a user of the computer system to initiate the changing at least one of the pedestal voltage level and the signal threshold voltage level.

3. The computer system of claim 2, wherein:
    the software program provides an on-screen display capability.

4. The computer system of claim 1, wherein: the changing is initiated by a software program coupled to a processor.

5. The computer system of claim 1, wherein: the detecting includes comparing output of a synchronization processor to a stable time reference.

6. The computer system of claim 1, wherein: the detecting includes comparing output of a synchronization processor to phasing of an output of a video amplifier.

7. The computer system of claim 1, wherein:
    the transmission line carries horizontal synchronization signals.

8. The computer system of claim 1, wherein:
    at least one of the pedestal voltage level and the signal threshold voltage level is raised.

9. The computer system of claim 1, wherein:
    at least one of the pedestal voltage level and the signal threshold voltage level is lowered.

10. The computer system of claim 1, wherein:
    at least one of the pedestal voltage level and the signal threshold voltage level is changed by a predetermined amount.

11. The computer system of claim 10, wherein:
    the predetermined amount is approximately 100 mV.

12. The computer system of claim 1, wherein:
    the pedestal voltage level is changed.

13. The computer system of claim 12, wherein:
    the pedestal voltage level is changed by changing the potential of a point between the receiver input gate and an impedance approximating the characteristic impedance of the transmission line, wherein the approximating impedance is connected to ground.

14. The computer system of claim 1, wherein:
    the signal threshold voltage level is changed.

15. The computer system of claim 14, wherein:
    the signal threshold voltage level is changed by changing a reference voltage of the receiver input gate at a monitor end of the transmission line.

16. A method of reducing an effect of signal distortion from reflection on a transmission line, comprising:
    changing at least one of a pedestal voltage level on the transmission line and a signal threshold voltage level of a receiver input gate coupled to the transmission line, such that the pedestal voltage level and the signal threshold voltage level are not substantially equal after the changing, and such that the effect of signal distortion from reflection on the transmission line is reduced;
    detecting the effect of signal distortion from reflection on the transmission line caused by a substantial equality of the pedestal voltage level and the signal threshold voltage level; and
    the detecting including monitoring an output of the synchronization processor for irregularly timed output signals by comparison to phasing of an output of a video amplifier.

17. The method of claim 16, wherein:
    the changing includes using a software program coupled to a first processor to initiate the changing.

18. The method of claim 17, wherein:
    the software program provides an on-screen display capability.

19. The method of claim 16 wherein:
    the transmission line is contained in an interface cable connecting
    a second processor coupled to a memory; and
    the second processor contains the signal threshold voltage level.

20. The method of claim 19, wherein:
    the transmission line carries horizontal synchronization signals.

21. The method of claim 16, wherein:
    the changing includes raising at least one of the pedestal voltage level and the signal threshold voltage level.

22. The method of claim 16, wherein:
    the changing includes lowering at least one of the pedestal voltage level and the signal threshold voltage level.

23. The method of claim 16, wherein
    the changing includes changing at least one of the pedestal voltage level and the signal threshold voltage level by a predetermined amount.

24. The method of claim 23, wherein:
    the predetermined amount is approximately 100 mV.

25. The method of claim 16, wherein:
    the pedestal voltage level is changed.

26. The method of claim 25, wherein
    the pedestal voltage level is changed by changing the potential of a point between the receiver input gate and an impedance approximating the characteristic impedance of the transmission line, wherein the approximating impedance is connected to ground.

27. The method of claim 16, wherein
the signal threshold voltage level is changed.

28. The method of claim 27, wherein:
the signal threshold voltage level is changed by changing a reference voltage of the receiver input gate at an end of the transmission line that is coupled to a monitor.

29. The method of claim 16, wherein:
the changing is initiated by a software program when the monitoring detects irregularly timed output signals.

30. An apparatus for reducing an effect of signal distortion from reflection on a transmission line, comprising:
means for changing at least one of a pedestal voltage level on the transmission line and a signal threshold voltage level of a receiver input gate coupled to the transmission line, such that the pedestal voltage level and the signal threshold voltage level are not substantially equal after the changing, and such that the effect of signal distortion from reflection on the transmission line is reduced;

means for detecting the effect of signal distortion from reflection on the transmission line caused by a substantial equality of the pedestal voltage level and the signal threshold voltage level; and the means for detecting including monitoring an output of the synchronization processor for irregularly timed output signals by comparison to phasing of an output of a video amplifier.

* * * * *

UNITED STATES PATENT AND TRADEMARK OFFICE
CERTIFICATE OF CORRECTION

PATENT NO. : 6,925,559 B2 Page 1 of 1
DATED : August 2, 2005
INVENTOR(S) : Badger, Michael H.

It is certified that error appears in the above-identified patent and that said Letters Patent is hereby corrected as shown below:

<u>Title page,</u>
Item [54], Title, delete "RECEVER" and insert -- RECEIVER --.

Signed and Sealed this

Eighteenth Day of October, 2005

JON W. DUDAS
*Director of the United States Patent and Trademark Office*